No. 709,959. Patented Sept. 30, 1902.
F. P. BRINING
VEHICLE TIRE.
(Application filed Feb. 14, 1902)
(No Model.)
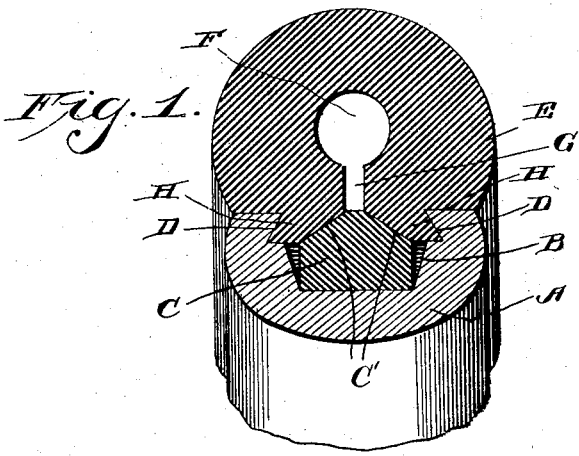
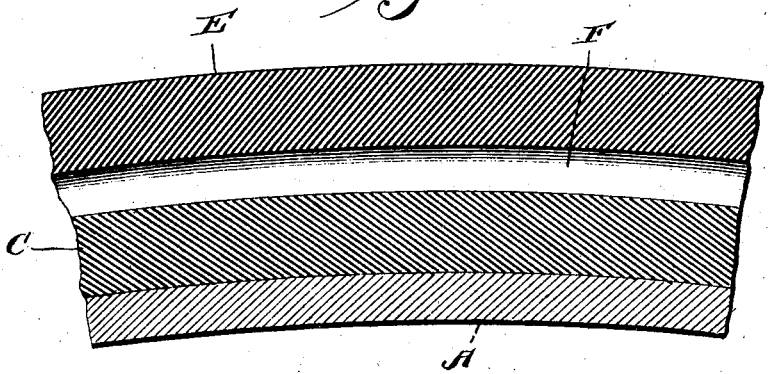
Witnesses:
Louis D. Heinrichs
L. H. Morrison
Inventor
Frank P. Brining
By W. Preston Williamson
Atty

UNITED STATES PATENT OFFICE.

FRANK P. BRINING, OF WESTGROVE, PENNSYLVANIA.

VEHICLE-TIRE.

SPECIFICATION forming part of Letters Patent No. 709,959, dated September 30, 1902.

Application filed February 14, 1902. Serial No. 93,992. (No model.)

*To all whom it may concern:*

Be it known that I, FRANK P. BRINING, a citizen of the United States, residing at Westgrove, county of Chester, and State of Pennsylvania, have invented a certain new and useful Improvement in Vehicle-Tires, of which the following is a specification.

My invention relates to a new and useful improvement in vehicle-tires, and has for its object to provide a vehicle-tire which will not depend upon the pneumatic principle for its resiliency, but will at the same time have all the resiliency and advantages of the pneumatic tire, without the disadvantages attendant thereto; and a further object of my invention is to provide for the easy insertion and removal of the tire to and from the felly.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a cross-section of a tire and felly. Fig. 2 is a longitudinal section of a portion of a tire and felly.

A represents the felly of the wheel, which has the annular groove B formed therein, in which is cemented or secured in any other suitable manner a ring of comparatively soft rubber C. The walls of the groove B are grooved and undercut at D, as shown in Fig. 1.

E is a tire, which consists of a solid ring of rubber having the circular opening F formed therethrough, and this tire is split from the opening F to its edge, as illustrated at G, and has formed therewith the tongues H, which are adapted to fit into the undercut groove D of the felly. The soft-rubber ring C is beveled at C' upon its outer edge, and the inner face of the tire E is beveled to correspond upon each side of the slit G. Thus when it is desired to insert the tire E into the felly the tongues or beveled ridges H upon the tire E are pressed or sprung within the undercut grooves D of the felly, and the extension of the rubber tire E, together with the wedging extension of the soft rubber C, will tend to hold the tire in place upon the felly, and when the weight of the rider or vehicle is upon the tire the tendency of the wedged face of the ring C will be to cause the two portions of the tire upon each side of the slide G to spread and to be more closely held within the undercut grooves D of the felly, so that the heavier the weight placed upon the vehicle the more tendency the tire has to hold itself in conjunction with the felly, and at the same time the soft-rubber ring C and the opening F and slide G will give to the tire a great resiliency equal to the pneumatic tire without any of the disadvantages of such a tire, and at any time that this tire shall need replacing with a new tire the old tire may be easily detached and a new one inserted in the felly in a very short space of time.

Of course I do not wish to be limited to the exact construction here shown, as slight modifications could be made without departing from the spirit of my invention.

Having thus fully described my invention, what I claim as new and useful is—

1. A felly having an annular groove formed in the same, a ring of soft rubber secured within said groove, undercut grooves formed in the walls of the groove, a rubber tire, beveled edges or tongues formed upon the tire adapted to fit within the undercut grooves, an opening formed through the tire, a slit formed from the opening to the inner face of the tire, beveled surfaces formed upon the outside of the soft-rubber ring, beveled surfaces formed upon the inner face of the rubber tire adapted to fit upon the beveled surfaces of the ring, substantially as and for the purpose specified.

2. In a device of the character described, a felly having an annular channel formed therein, undercut grooves formed in the walls of said channel, a ring of soft rubber secured in the channel the outer face of said ring beveled upon each side, a tire having an opening formed therethrough, the inner face of said tire divided by a slit formed from the opening to the inner face, said tire so formed as to be sprung into the undercut grooves of the felly and to impinge upon the soft-rubber ring within the same so that the two portions of the inner edge of the tire will be spread by
5 the beveled surfaces of said ring when pressure is applied to the tire, substantially as described and for the purpose specified.

In testimony whereof I have hereunto affixed my signature in the presence of two subscribing witnesses.

FRANK P. BRINING.

Witnesses:
J. PRICE NICHOLS,
HARRY E. HOOPES.